United States Patent
Makino et al.

(10) Patent No.: US 11,693,290 B2
(45) Date of Patent: Jul. 4, 2023

(54) OPTICAL WAVEGUIDE DEVICE

(71) Applicant: Fujitsu Optical Components Limited, Kawasaki (JP)

(72) Inventors: Shuntaro Makino, Kawasaki (JP); Yoshinobu Kubota, Yokohama (JP); Yasuhiro Ohmori, Sapporo (JP); Masaharu Doi, Sapporo (JP); Teruo Kurahashi, Isehara (JP); Shintaro Takeuchi, Sapporo (JP)

(73) Assignee: Fujitsu Optical Components Limited, Kawasaki (JP)

( * ) Notice: Subject to any disclaimer, the term of this patent is extended or adjusted under 35 U.S.C. 154(b) by 166 days.

(21) Appl. No.: 17/165,562

(22) Filed: Feb. 2, 2021

(65) Prior Publication Data

US 2021/0325760 A1 Oct. 21, 2021

(30) Foreign Application Priority Data

Apr. 21, 2020 (JP) .................. 2020-075239

(51) Int. Cl.
*G02F 1/225* (2006.01)
*G02F 1/03* (2006.01)
*G02F 1/035* (2006.01)

(52) U.S. Cl.
CPC .............. *G02F 1/225* (2013.01); *G02F 1/035* (2013.01); *G02F 1/0316* (2013.01); *G02F 2201/07* (2013.01); *G02F 2201/12* (2013.01); *G02F 2202/20* (2013.01)

(58) Field of Classification Search
CPC ........ G02F 1/225; G02F 1/0316; G02F 1/035; G02F 2201/07; G02F 2201/12; G02F 2202/20
See application file for complete search history.

(56) References Cited

U.S. PATENT DOCUMENTS

| 5,404,412 | A | * | 4/1995 | Seino | ........... | G02F 1/0123 |
| | | | | | | 385/132 |
| 5,680,497 | A | * | 10/1997 | Seino | ........... | G02F 1/0123 |
| | | | | | | 385/2 |

(Continued)

FOREIGN PATENT DOCUMENTS

| JP | 2008-089936 A | 4/2008 |
| JP | 2008-233513 A | 10/2008 |

(Continued)

OTHER PUBLICATIONS

Honardoost et al., Towards subterahertz bandwidth ultracompact lithium niobate electrooptic modulators, Optics Express, V. 27, N. 5, 2019 (Year: 2019).*

(Continued)

*Primary Examiner* — Peter Radkowski
(74) *Attorney, Agent, or Firm* — Staas & Halsey LLP

(57) ABSTRACT

An optical waveguide device includes a substrate on which an intermediate layer, a thin-film LN layer of lithium niobate, and a buffer layer are stacked; an optical waveguide formed in the thin-film LN layer; and a plurality of electrodes near the optical waveguide. The intermediate layer and the buffer layer contain a same material of a metal element of any one of group 3 of group 18 of a periodic table of elements.

13 Claims, 7 Drawing Sheets

(56) References Cited

U.S. PATENT DOCUMENTS

| | | | |
|---|---|---|---|
| 6,255,148 B1* | 7/2001 | Hara | H01L 29/66757 257/E21.415 |
| 6,873,749 B2* | 3/2005 | Gibson | G02F 1/225 385/129 |
| 8,644,647 B2* | 2/2014 | Ichikawa | G02F 1/2255 385/2 |
| 9,244,296 B2* | 1/2016 | Iwatsuka | G02F 1/035 |
| 2003/0156474 A1* | 8/2003 | Gibson | G02F 1/225 365/200 |
| 2009/0231686 A1* | 9/2009 | Atkins | G02B 6/12002 385/28 |
| 2009/0324156 A1* | 12/2009 | Kinpara | G02F 1/0356 385/2 |
| 2010/0232736 A1* | 9/2010 | Ichikawa | G02F 1/0356 385/2 |
| 2015/0138619 A1* | 5/2015 | Iwatsuka | G02F 1/035 359/245 |
| 2018/0011348 A1* | 1/2018 | Yanagawa | G02F 1/0316 |
| 2021/0325760 A1* | 10/2021 | Makino | G02F 1/225 |

FOREIGN PATENT DOCUMENTS

| | | |
|---|---|---|
| JP | 2014-106397 A | 6/2014 |
| JP | 2014-142411 | 8/2014 |
| JP | 2016-191798 A | 11/2016 |
| JP | 2019-45880 | 3/2019 |

OTHER PUBLICATIONS

Office Action, dated Oct. 6, 2022, in U.S. Appl. No. 17/169,983 (18 pp.).

U.S. Appl. No. 17/169,983, filed Feb. 8, 2021, Shuntaro Makino et al., Fujitsu Optical Components Limited.

Notice of Allowance, dated Feb. 23, 2023, in U.S. Appl. No. 17/169,983 (13 pp.).

* cited by examiner

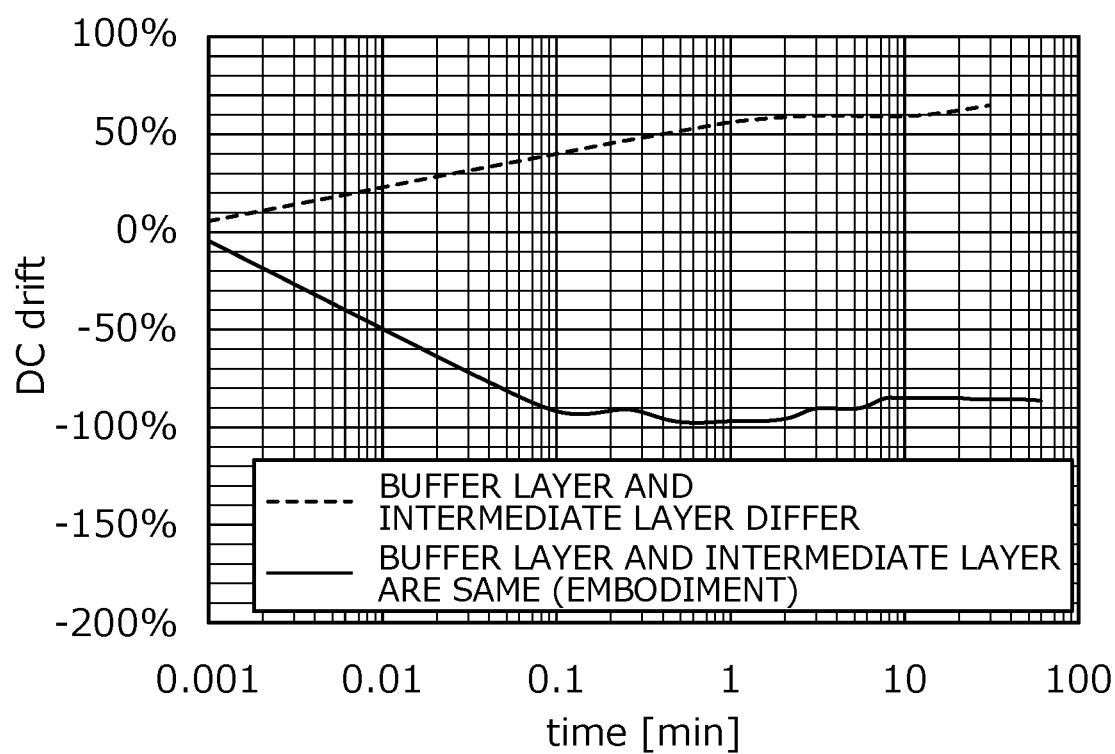

OPTICAL WAVEGUIDE DEVICE

CROSS REFERENCE TO RELATED APPLICATIONS

This application is based upon and claims the benefit of priority of the prior Japanese Patent Application No. 2020-075239, filed on Apr. 21, 2020, the entire contents of which are incorporated herein by reference.

FIELD

The embodiments discussed herein relate to an optical waveguide device.

BACKGROUND

To increase the speed of optical communication, high-performance optical devices are indispensable. Among optical devices, a conventional LN optical modulator uses a lithium niobate ($LiNbO_3$, hereinafter, LN) substrate and, thus, is able to obtain favorable characteristics in terms of insertion loss and transmission characteristics. On the LN substrate, an optical waveguide is formed by diffusing titanium (Ti). While conventional LN optical modulators (bulk LN modulators) that use such an LN substrate are widely used, the size thereof is increasing.

In recent years, demand for smaller optical devices has increased and reduction of the size of LN optical modulators used in optical transceivers is also being studied. A thin-film LN optical modulator that uses a thin-film LN is one such LN optical modulator having a smaller size. The thin-film LN optical modulator has a Mach-Zehnder interferometer structure and a structure in which layers such as an intermediate layer, a thin-film LN, a buffer layer, and electrodes are provided on a substrate.

An art related to a bulk LN optical modulator, for example, has two layers (upper and lower) that bond buffer layers to each other, and the art uses a doped buffer layer containing an oxide or a non-oxide of indium for the lower layer. Further, a non-doped buffer layer that does not contain a metal element (or an oxide thereof) belonging to group 3 to group 8, group IB, or group IIB of the periodic law table (hereinafter, group 3 to group 18 of the periodic table of elements), or a semiconductor element other than Si or an oxide thereof is used as the upper layer. A technique that stabilizes direct current (DC) drift characteristics in this manner has been disclosed (for example, refer to Japanese Laid-Open Patent Publication No. 2008-233513). Further, a technique has been disclosed that stabilizes DC drift characteristics by configuring a non-conductive layer (corresponds to a buffer layer) using a material that contains silicon oxide, an oxide of indium, and an oxide of titanium (corresponds to group 3 to group 18 of the periodic table of elements) and in which a ratio of a molarity of titanium oxide and a molarity of indium oxide is at least 1.2 (for example, refer to Japanese Laid-Open Patent Publication No. 2016-191798). Further, for example, a technique has been disclosed that stabilizes DC drift characteristics by using a mixture or a compound of silicon oxide and an oxide of at least one metal element corresponding to any one of group 3 to group 18 of the periodic table of elements in a buffer layer (for example, refer to U.S. Pat. No. 5,680,497). Further, a technique has been disclosed that stabilizes DC drift characteristics by forming a buffer layer from a mixture of silicon dioxide and at least one element oxide selected from a group including a semiconductor element other than silicon and metal elements corresponding to any one of group 3 to group 18 of the periodic table of elements (for example, refer to U.S. Published Patent Application No. 2003/156474).

Further, as an art related a thin-film LN optical modulator, for example, a technique has been disclosed that includes an optical waveguide in a thin substrate that exhibits an electro-optic effect (corresponds to a thin-film LN) and control electrodes provided via buffer layers sandwiching the thin substrate above and below for impedance matching, etc. (for example, refer to Japanese Laid-Open Patent Publication No. 2008-89936 and U.S. Published Patent Application No. 2010/232736). Further, a technique has been disclosed that enables formation of a thin-film having a favorable crystalline property by stacking an epitaxially grown buffer layer, a cladding layer, an electro-optic layer (corresponds to thin-film LN), a buffer layer, and an electrode on a single crystalline Si substrate (for example, refer to Japanese Laid-Open Patent Publication No. 2014-106397).

SUMMARY

An optical waveguide device includes a substrate on which an intermediate layer, a thin-film LN layer of lithium niobate, and a buffer layer are stacked; an optical waveguide formed in the thin-film LN layer; and a plurality of electrodes near the optical waveguide. The intermediate layer and the buffer layer contain a same material of a metal element of any one of group 3 to group 18 of a periodic table of elements.

An object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a graph of DC drift characteristics of the thin-film LN optical modulator according to the first embodiment.

DESCRIPTION OF THE INVENTION

First, problems associated with the related arts are discussed. In the optical modulators, voltage applied to the optical waveguide from an electrode has to be properly controlled. In the LN optical modulator, at an instance when voltage is applied and after sufficient time has elapsed, variation of the voltage applied to the optical waveguide, so-called DC drift occurs. In the conventional techniques, to suppress DC drift in the bulk LN optical modulator, a configuration using a material for suppressing DC drift in the buffer layer is described. However, the thin-film LN optical modulator has a structure in which the intermediate layer, the thin-film LN layer, the buffer layer, and the electrode are stacked on the substrate and DC drift cannot be suppressed by merely using a material for suppressing DC drift in the buffer layer.

Embodiments of an optical waveguide device is described with reference to the accompanying drawings. In the embodiments, a thin-film LN optical modulator is described as an example of the optical waveguide device. The thin-film LN optical modulator includes an optical transceiving unit for optical transmission and converts an input electrical signal into an optical signal and optically transmits the optical signal.

Figure 1A:
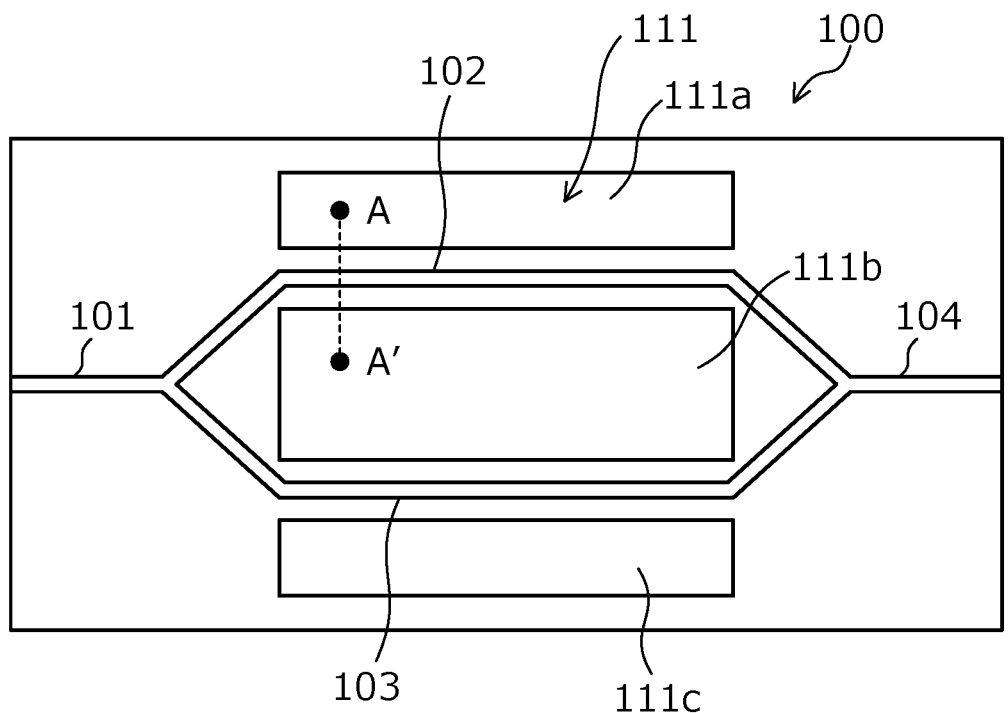
FIG. 1A is a plan view of a thin-film LN optical modulator according to a first embodiment.
Figure 1B:
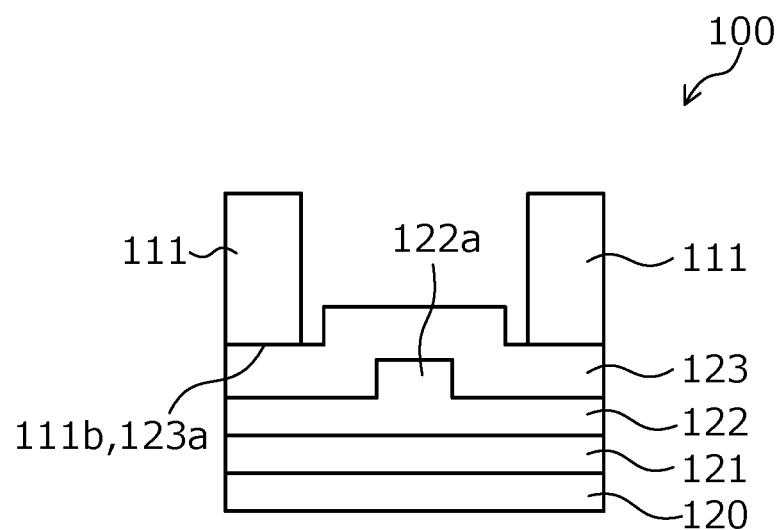
FIG. 1B is a cross-sectional view of the thin-film LN optical modulator along cutting line A-A' in FIG. 1A.

FIGS. 1A and 1B are diagrams of a thin-film LN optical modulator according to a first embodiment. FIG. 1A is a plan view a thin-film LN optical modulator 100 and FIG. 1B is a cross-sectional view along cutting line A-A' in FIG. 1A.

The thin-film LN optical modulator 100 described herein is a Mach-Zehnder-type optical modulator and voltage is applied to a Mach-Zehnder interferometer formed by an optical waveguide that exhibits the electro-optic effect, whereby the thin-film LN optical modulator 100 modulates light propagated in the optical waveguide.

As depicted in FIG. 1A, an optical waveguide 101 branches into two optical waveguides 102, 103 that are combined into an optical waveguide 104. Electrodes 111 (111a, 111b, 111c) are provided near the branched optical waveguides 102, 103, for example, on each side of the optical waveguides 102, 103.

When a voltage V of the electrodes 111 is 0, light input to the optical waveguide 101 is branched into two and proceeds through the optical waveguides 102, 103, is combined by the optical waveguide 104 and output. Further, when a voltage π is applied to the electrodes 111, a reverse electric field occurs at the optical waveguides 102, 103, and due to refractive index variation of the optical waveguides 102, 103, a difference in phase occurs between the lights traveling therein. In an instance of a voltage that causes the difference in phase to be π, the two branches of light interfere with each other and cancel each other out, however, by varying the applied voltage between 0-Vπ, optical output that is intensity-modulated may be obtained.

As depicted in FIG. 1B, the thin-film LN optical modulator 100 is a structure in which an intermediate layer 121, a thin-film LN layer 122, and a buffer layer 123 are stacked on a substrate 120. The substrate 120, for example, may contain LN, Si, $SiO_2$, etc. In the thin-film LN layer 122, lithium niobate ($LiNbO_3$) having X-cut crystal orientation is used and etched, whereby a ridge-type optical waveguide is formed. A convex ridge portion functions as an optical waveguide 122a through which light travels. The optical waveguide 122a depicted in FIG. 1B corresponds to the optical waveguide 102 depicted in FIG. 1A.

In the thin-film LN layer 122, for example, lithium niobate is used. The thin-film LN layer 122 may contain Z-cut lithium niobate or X-cut lithium niobate. In the first embodiment, for example, a configuration using X-cut lithium niobate is assumed. Thus, application of electric field from directions above and below the optical waveguide 122a is unnecessary, enabling the electrodes 111 to be disposed at the sides of the optical waveguide 122a and light to be confined to an extremely small area (the optical waveguide 122a). Further, by reducing an interval between the optical waveguide 122a and the electrodes 111, an advantage of thin-film LN may be maximized, that is, the electric field efficiency may be improved.

In the thin-film LN optical modulator 100 of the first embodiment, the intermediate layer 121 is provided beneath the thin-film LN layer 122 and the buffer layer 123 is provided above the thin-film LN layer 122. The intermediate layer 121 and the buffer layer 123 are provided to strengthen the confinement of light to the optical waveguide 122a formed in the thin-film LN layer 122. The intermediate layer 121 and the buffer layer 123 contain a material having a refractive index lower than a refractive index of the thin-film LN layer 122, for example, $SiO_2$.

As a technique of manufacturing a stacked structure, direct bonding of wafers may be used. In this instance, an adhesive layer may be provided between layers when an adhesive layer for bonding is necessary therebetween.

Further, in the first embodiment, a same material may be used in the intermediate layer 121 and in the buffer layer 123. Examples of the material used in the intermediate layer 121 and the buffer layer 123 are shown in a first example to an eighth example.

In the first example, the intermediate layer 121 and the buffer layer 123 use a material that contains silicon oxide and an oxide of indium. In the second example, the intermediate layer 121 and the buffer layer 123 use a material that contains silicon oxide and an oxide of titanium. In the third example, a material that contains silicon oxide and an oxide of tin is used in the intermediate layer 121 and the buffer layer 123. In the fourth example, a material that contains silicon oxide and an oxide of germanium is used in the intermediate layer 121 and the buffer layer 123. In the fifth example, a material that contains silicon oxide and an oxide of zinc is used in the intermediate layer 121 and the buffer layer 123. In the sixth example, a mixture or a compound of silicon oxide and an oxide of at least one metal element of any one of group 3 to group 18 of the periodic table of elements is used in the intermediate layer 121 and the buffer layer 123. In the seventh example, a mixture or a compound of silicon oxide and an oxide of at least one semiconductor element excluding silicon is used in the intermediate layer 121 and the buffer layer 123. In the eighth example, a mixture or a compound of silicon oxide and an oxide containing at least one semiconductor element excluding silicon and at least one metal element of any one of group 3 to group 18 of the periodic table of elements is used in the intermediate layer 121 and the buffer layer 123.

In this manner, in each of the first to eighth examples in which the same material is used in the intermediate layer 121 and the buffer layer 123, DC drift of the thin-film LN optical modulator 100 may be suppressed.

FIG. 2 is a graph of DC drift characteristics of the thin-film LN optical modulator according to the first embodiment. A horizontal axis is the elapsed time after voltage is applied to the thin-film LN optical modulator 100 and a vertical axis is the DC drift amount (%). In the graph, a solid line indicates DC drift characteristics of the first embodiment (the first example). Further, in the graph, a dotted line indicates DC drift characteristics in an instance in which the materials of the intermediate layer 121 and the buffer layer 123 differ from each other (for example, an instance corresponding to Japanese Laid-Open Patent Publication No. 2008-89936 in which the intermediate layer 121 is zirconium oxide and the buffer layer 123 is silica or alumina).

In the thin-film LN optical modulator 100, the voltage applied to the electrodes 111 causes the phenomenon of DC drift, which varies at the instant when the voltage is applied and after sufficient time has elapsed. Variation of the voltage appears as variation of emitted light output by the thin-film LN optical modulator 100 and therefore, stable operation of the thin-film LN optical modulator 100 is indispensable in suppressing DC drift. The DC drift amount is proportional to the applied voltage and therefore, is generally expressed as a percentage of the applied voltage.

Here, assuming DC voltage applied to the electrodes 111 is $V_{DC}$, the applied voltage at time t is V(t), and the voltage at the instant of application is V(0), the drift amount is expressed by formula (1).

$$\{V(t)-V(0)\}/V_{DC} \quad (1)$$

When positive drift is 100%, regardless of how large the applied voltage is, control is impossible. Therefore, a longer state of negative drift enables long-term reliability of the thin-film LN optical modulator 100 to be ensured. In FIG. 2, conditions (the substrate 120, the thin-film LN layer 122, the electrodes 111) other than the materials of the buffer layer 123 and the intermediate layer 121 are similar to one another.

Further, FIG. 2 illustrates that use of the same material containing a metal element of any one of group 3 to group 18 of the periodic table of elements described in the first embodiment is used in the buffer layer 123 and the intermediate layer 121 enables the negative drift state to be prolonged. Any one of the materials shown in the first example to the eighth example is suitably selected according to material cost and desired DC drift characteristics. In all of the first to the eighth examples, the negative drift state depicted in FIG. 2 could be obtained.

In this manner, according to the first embodiment, use of the same material containing a metal element of any one of group 3 to group 18 of the periodic table of elements in the buffer layer 123 and the intermediate layer 121 of the thin-film LN optical modulator 100 enables the negative state to be prolonged and DC drift characteristics to be significantly improved. As a result, it becomes possible to ensure long-term reliability of the thin-film LN optical modulator 100.

With reference to FIGS. 3A to 7B, the thin-film LN optical modulator 100 according to a second embodiment is described. In the following configuration example, as described in the first embodiment, a material containing a metal element of any one of group 3 to group 18 of the periodic table of elements is assumed to be used in the buffer layer 123 and the same material is assumed to be used in the intermediate layer 121. As a result, in addition to suppression of DC drift that is one characteristic of the thin-film LN optical modulator 100 described above, scattering loss is reduced and electric field efficiency characteristics are enhanced.

Here, tradeoff between scattering loss and electric field efficiency is described. In the thin-film LN optical modulator 100, to strengthen confinement of light to the optical waveguide 122a, when a border between air and the buffer layer is close to the optical waveguide 122a, scattering loss occurs due to roughness of sidewalls of the optical waveguide 122a. The roughness of the sidewalls corresponds to numerous minute burrs that occur on sidewalls of a protruding portion when a ridge-shaped portion is formed. Further, when the buffer layer 123 is formed covering the ridge-shaped portion, at sidewall portions of the buffer layer 123, similar roughness of the sidewalls thereof occurs.

To reduce scattering loss due to sidewall roughness, the thickness of the buffer layer 123 has to be increased. On the other hand, electric field efficiency of the thin-film LN optical modulator 100 increases the shorter is a distance between the electrodes 111 and the optical waveguide 122a and therefore, to increase the electric field efficiency and reduce the size of the thin-film LN optical modulator 100, the thickness of the buffer layer 123 has to be reduced. In this manner, in the thin-film LN optical modulator 100, regarding the thickness of the buffer layer 123, tradeoff between reducing scattering loss and improving the electric field efficiency (size reduction) is problematic.

Further, in an instance of a thin-film LN optical modulator in which a Z-cut is used in the thin-film LN layer 122, electric field has to be applied in a vertical direction and, for example, compared to an instance in which an X-cut is used, improvement of the electric field efficiency by simply reducing the electrode spacing is difficult. To address this problem, in the second embodiment as well, an X-cut lithium niobate is used in the thin-film LN layer 122. Further, in the second embodiment, configuration such as materials, etc. of parts (the substrate 120, the intermediate layer 121, the thin-film LN layer 122, the electrodes 111) is similar to that of the first embodiment.

Further, in various configuration examples of the second embodiment, near the optical waveguide 122a, a predetermined thickness is left as is as the buffer layer 123 while positions where the electrodes 111 are to be formed are lowered.

Figure 3A:
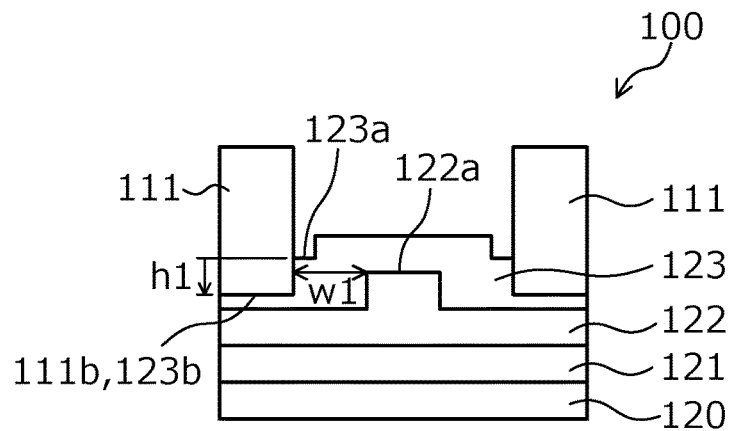
FIG. 3A is a cross-sectional view of a configuration example of the thin-film LN optical modulator according to a second embodiment.
Figure 3B:
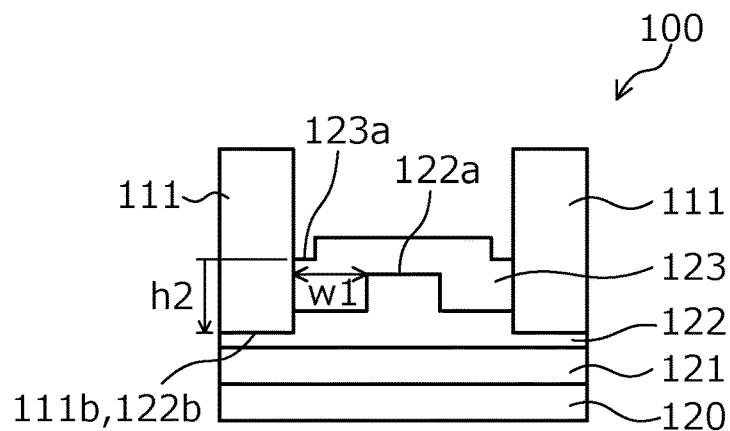
FIG. 3B is a cross-sectional view of a configuration example of the thin-film LN optical modulator according to the second embodiment.
Figure 3C:
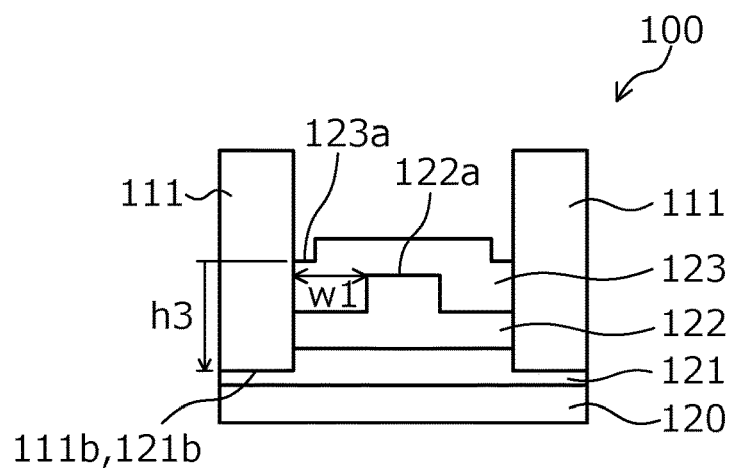
FIG. 3C is a cross-sectional view of a configuration example of the thin-film LN optical modulator according to the second embodiment.

FIGS. 3A, 3B, and 3C are cross-sectional views of configuration examples of the thin-film LN optical modulator according to the second embodiment. FIGS. 3A, 3B, and 3C correspond to cross-sectional views along cutting line A-A' in FIG. 1A. In the configuration example depicted in FIG. 3A, the buffer layer 123 having a predetermined thickness is stacked on the thin-film LN layer 122. Here, the buffer layer 123 is formed having a constant thickness at a top and sides of the optical waveguide 122a, in a shape that follows a convex shape of the ridge portion of the optical waveguide 122a. Here, in the buffer layer 123, recesses 123a corresponding to the convex shape of the optical waveguide 122a are formed at both sides of the optical waveguide 122a, a predetermined distance from the optical waveguide 122a.

Thereafter, in the buffer layer 123, portions thereof where the electrodes 111 are to be provided (the recesses 123a) are etched. With the optical waveguide 122a as a center, the electrodes 111 are provided at both sides of the optical waveguide 122a, a predetermined distance therefrom. The buffer layer 123 is etched, whereby steps 123b are formed respectively at the portions of the buffer layer 123 where electrodes 111 are to be provided.

Subsequently, the electrodes 111 are formed on the steps 123b of the buffer layer 123. The electrodes 111, for example, may be formed by vapor deposition of gold (Au), etc. Thus, positions of the steps 123b in a height direction are positions that are lower, by a height h1, than positions of the recesses 123a of the buffer layer 123 before the etching thereof.

Further, the electrodes 111 are provided on the steps 123b of the buffer layer 123, whereby the electrodes 111 are a distance (width) w1 from the optical waveguide 122a and may be as close as possible to the optical waveguide 122a. The width w1 corresponds to a predetermined thickness when the buffer layer 123 is stacked on the thin-film LN layer 122 and has an effect of confining light to the optical waveguide 122a.

In this manner, the steps 123b are formed in portions of the buffer layer 123 where the electrodes 111 are to be formed, whereby the thickness of the buffer layer 123 itself centered around the optical waveguide 122a is ensured and the electrodes 111 may be disposed near the optical waveguide 122a.

As a result, the tradeoff related to the thickness of the buffer layer is eliminated and the thin-film LN optical modulator 100 having low scattering loss and high electric field efficiency may be realized.

In configuration examples depicted in FIGS. 3B and 3C, the amount of etching is greater than that in configuration example depicted in FIG. 3A. In the configuration example depicted in FIG. 3B, an entire area of the portions of the buffer layer 123 where the electrodes 111 are formed (the recesses 123a) is etched. In addition, portions of the thin-film LN layer 122 are also etched a predetermined amount, thereby forming steps 122b in the thin-film LN layer 122. Further, the electrodes 111 are formed on the steps 122b of the thin-film LN layer 122 by vapor deposition, etc.

As a result, positions of the steps 122b in the height direction are positions lower by a height h2 than the positions of the recesses 123a of the buffer layer 123 before the etching thereof. Further, bottom surfaces 111b of the electrodes 111 are positioned and provided on the steps 122b of the thin-film LN layer 122, whereby the electrodes 111 have the distance (width) w1 from the optical waveguide 122a and may be as close as possible to the optical waveguide 122a.

In the configuration example depicted in FIG. 3C, an entire area of the portions of the buffer layer 123 where the electrodes 111 are to be provided (the recesses 123a) is etched. In addition, an entire area of the thin-film LN layer 122 and the intermediate layer 121 is also etched a predetermined amount, thereby forming steps 121b in portions of the intermediate layer 121. Further, the electrodes 111 are formed on the steps 121b of the intermediate layer 121.

Thus, positions of the steps 121b in the height direction are positions lower by a height h3 than the positions of the recesses 123a of the buffer layer 123 before the etching thereof. Further, the electrodes 111 are provided having the bottom surfaces 111b thereof positioned on the steps 121b of the intermediate layer 121, whereby the electrodes 111 have the distance (width) w1 from the optical waveguide 122a and may be as close as possible to the optical waveguide 122a.

The etching amount in the configuration example depicted in FIG. 3B is greater than that in the configuration example depicted in FIG. 3A while the etching amount in the configuration example depicted in FIG. 3C is greater than that in the configuration example depicted in FIG. 3B. While the electric field efficiency is enhanced the greater is the etching amount, process difficulty also increases and therefore, an optimal structure is selected with consideration of necessary characteristics such as electric field efficiency, ease of manufacture, etc.

Figure 4A:
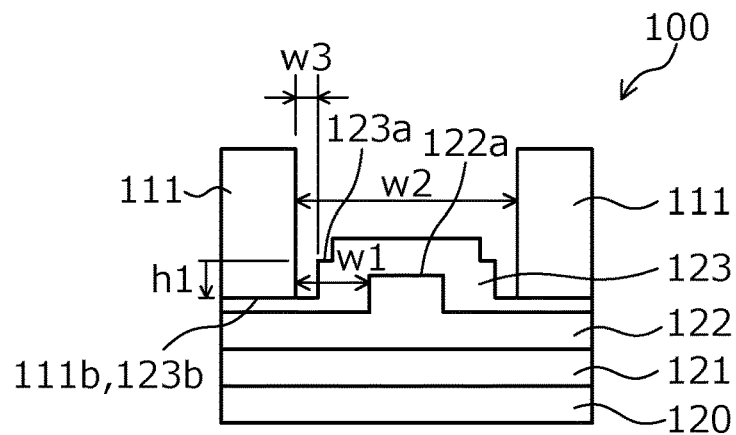
FIG. 4A is a cross-sectional view of another configuration example of the thin-film LN optical modulator according to the second embodiment.
Figure 4B:
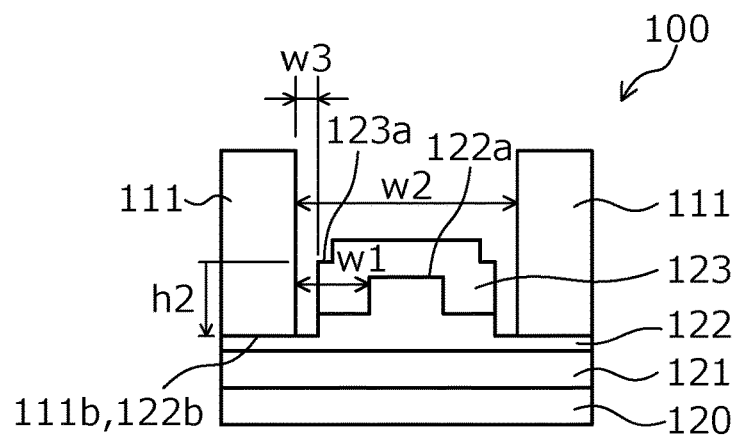
FIG. 4B is a cross-sectional view of another configuration example of the thin-film LN optical modulator according to the second embodiment.
Figure 4C:
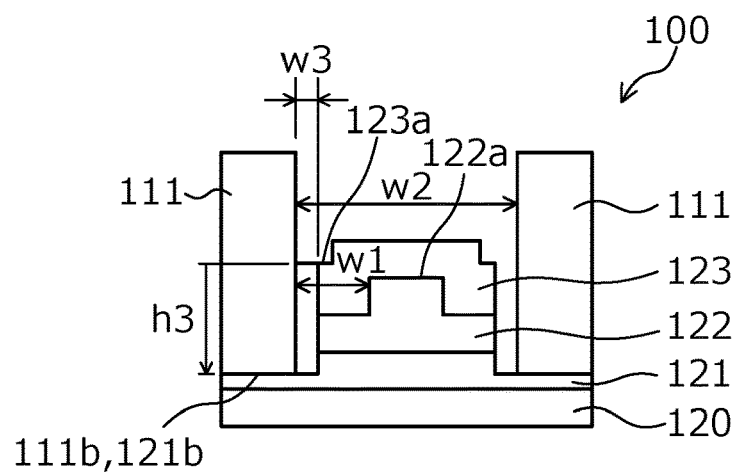
FIG. 4C is a cross-sectional view of another configuration example of the thin-film LN optical modulator according to the second embodiment.

FIGS. 4A, 4B, and 4C are cross-sectional views of other configuration examples of the thin-film LN optical modulator according to the second embodiment. FIGS. 4A, 4B, and 4C also correspond to cross-sections along cutting line A-A' in FIG. 1A. In the configuration examples described using FIGS. 3A, 3B, and 3C, examples in which sidewalls of the electrodes 111 are in contact with the buffer layer 123 are described.

Nonetheless, in actuality, due to manufacturing tolerances, etc., the sidewalls of the electrodes 111 may be provided separate from the buffer layer 123. For example, during etching when openings of a mask provided on the buffer layer 123 are formed or when the electrodes 111 are formed, a gap may occur between a sidewall of the electrodes 111 and a sidewall of the buffer layer 123 due to shifts in arrangement positions, opening diameter error, etc. of the openings of the mask provided on the buffer layer 123 FIGS. 4A, 4B, and 4C depict configuration examples of instances in which the sidewalls of the electrodes 111 are apart from the buffer layer 123.

In the configuration example depicted in FIG. 4A, the buffer layer 123 having a predetermined thickness is stacked on the thin-film LN layer 122. Here, at a surface of the buffer layer 123, the recesses 123a are formed corresponding to the convex ridge portion of the optical waveguide 122a. Thereafter, the portions of the buffer layer 123 where the electrodes 111 are to be formed (the recesses 123a) are etched.

During this etching, with the optical waveguide 122a as a center, a portion (width w2) of the buffer layer 123 spanning formation regions of the steps 123b is masked and openings corresponding to the steps 123b are provided in the mask. Further, portions of the buffer layer 123 are etched from the openings of the mask. By this etching, the steps 123b are formed in portions of the buffer layer 123 where the electrodes 111 are to be formed.

Further, the electrodes 111 are formed on the steps 123b of the buffer layer 123. During formation of the electrodes 111, with the optical waveguide 122a as a center, a portion of the buffer layer 123 (the width w2) spanning formation regions of the steps 123b is masked and openings corresponding to the steps 123b are provided in the mask. Subsequently, the electrodes 111 are formed by vapor deposition from the openings of the mask.

Here, during etching when openings of the mask formed on the buffer layer 123 are formed or when the electrodes 111 are formed, a gap w3 occurs between a sidewall of the electrodes 111 and a sidewall of the buffer layer 123 due to shifts in arrangement positions, opening diameter error, etc. of the openings of the mask provided on the buffer layer 123. The gap w3, for example, occurs when an opening diameter of the mask during formation of the electrodes 111 is larger than an opening diameter of the mask during etching of the buffer layer 123.

In this manner, even in an instance in which the gap w3 occurs between a sidewall of the electrodes 111 and a sidewall of the buffer layer 123, positions of the steps 123b in the height direction are positions lower by the height h1 than the positions of the recesses 123a of the buffer layer 123 before the etching thereof. Further, the electrodes 111 are provided on the steps 123b of the buffer layer 123, whereby the electrodes 111 have the distance (width) w1 from the optical waveguide 122a and may be as close as possible to the optical waveguide 122a. The width w1 corresponds to a predetermined thickness when the buffer layer 123 is stacked on the thin-film LN layer 122 and has an effect of confining light to the optical waveguide 122a.

In this manner, the steps 123b are formed in portions of the buffer layer 123 where the electrodes 111 are to be formed. As a result, even in an instance in which the gap w3 is between a sidewall of the electrodes 111 and a sidewall of the buffer layer 123, the thickness of the buffer layer 123 itself centered around the optical waveguide 122a is ensured and the electrodes 111 may be disposed near the optical waveguide 122a.

As a result, the tradeoff related to the thickness of the buffer layer is eliminated and the thin-film LN optical modulator 100 having low scattering loss and high electric field efficiency may be realized.

In configuration examples depicted in FIGS. 4B and 4C, the amount of etching is greater than that in configuration example depicted in FIG. 4A. In the configuration example depicted in FIG. 4B, an entire area of the portions of the buffer layer 123 where the electrodes 111 are formed (the recesses 123a) is etched. In addition, portions of the thin-film LN layer 122 are also etched a predetermined amount, thereby forming steps 122b in the portions of the thin-film LN layer 122. Further, the electrodes 111 are formed on the steps 122b of the thin-film LN layer 122 by vapor deposition, etc. Here, similarly to FIG. 4A, due to shifts in the position of the mask, opening diameter error, etc., the gap w3 is formed between a sidewall of the electrodes 111, the thin-film LN layer 122, and a sidewall of the buffer layer 123.

In this manner, even in an instance in which the gap w3 occurs between a sidewall of the electrodes 111, the thin-film LN layer 122, and a sidewall of the buffer layer 123, the positions of the steps 122b in the height direction are positions lower by the height h2 than the positions of the recesses 123a of the buffer layer 123 before the etching thereof. Further, the electrodes 111 are provided having the bottom surfaces 111b thereof positioned on the steps 122b of the thin-film LN layer 122, whereby the electrodes 111 have the distance (width) w1 from the optical waveguide 122a and may be as close as possible to the optical waveguide 122a.

In the configuration example depicted in FIG. 4C, an entire area of the portions of the buffer layer 123 where the electrodes 111 are to be provided (the recesses 123a) is etched. In addition, an entire area of the thin-film LN layer 122 and the intermediate layer 121 is also etched a predetermined about, thereby forming steps 121b in portions of the intermediate layer 121. Further, the electrodes 111 are formed on the steps 121b of the intermediate layer 121.

Here, similarly to FIG. 4A, due to shifts in the position of the mask, opening diameter error, etc., the gap w3 is formed between a sidewall of the electrodes 111, the thin-film LN layer 122, and a sidewall of the buffer layer 123.

In this manner, the gap w3 is assumed to occur between a sidewall of the electrodes 111, the intermediate layer 121, the thin-film LN layer 122, and a sidewall of the buffer layer 123. In this instance as well, the positions of the steps 121b in the height direction are positions lower by the height h3 than the positions of the recesses 123a of the buffer layer 123 before the etching thereof. Further, the electrodes 111 are provided having the bottom surfaces 111b thereof positioned on the steps 121b of the intermediate layer 121, whereby the electrodes 111 have the distance (width) w1 from the optical waveguide 122a and may be as close as possible to the optical waveguide 122a.

The etching amount in the configuration example depicted in FIG. 4B is greater than that in the configuration example depicted in FIG. 4A while the etching amount in the configuration example depicted in FIG. 4C is greater than that in the configuration example depicted in FIG. 4B. While the electric field efficiency is enhanced the greater is the etching amount, process difficulty also increases and therefore, an optimal structure is selected with consideration of necessary characteristics such as electric field efficiency, ease of manufacture, etc.

Figure 5A:
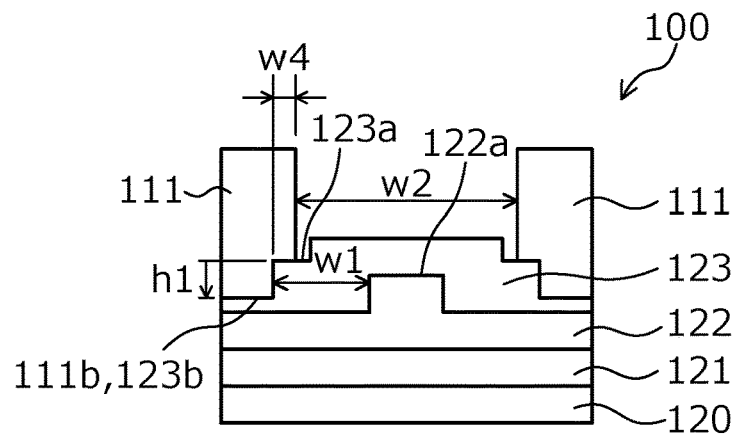
FIG. 5A is a cross-sectional view of another configuration example of the thin-film LN optical modulator according to the second embodiment.
Figure 5B:
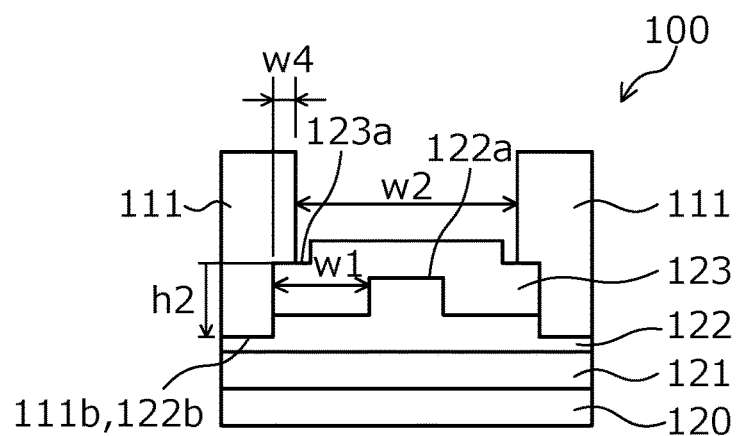
FIG. 5B is a cross-sectional view of another configuration example of the thin-film LN optical modulator according to the second embodiment.
Figure 5C:
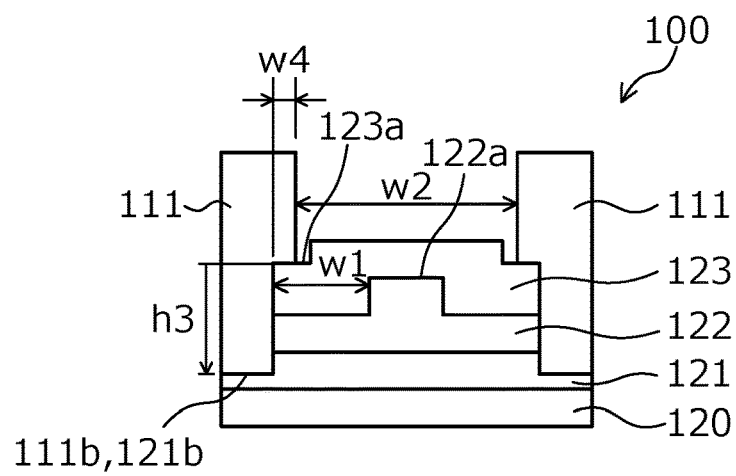
FIG. 5C is a cross-sectional view of another configuration example of the thin-film LN optical modulator according to the second embodiment.

FIGS. 5A, 5B, and 5C are cross-sectional views of other configuration examples of the thin-film LN optical modulator according to the second embodiment. FIGS. 5A, 5B, and 5C also correspond to cross-sections along cutting line A-A' in FIG. 1A. In the configuration examples described using FIGS. 4A, 4B, and 4C, examples in which the sidewalls of the electrodes 111 are apart from the buffer layer 123 by the gap w3 are described.

Contrary to the examples described with reference to FIGS. 4A, 4B, and 4C, due to manufacturing tolerances, etc., a part (sidewall) of the electrodes 111 may be positioned closer to the optical waveguide 122a than are the steps 123b of the buffer layer 123, which corresponds to the gap w3 being eliminated. For example, during etching when openings of a mask formed on the buffer layer 123 are formed or when the electrodes 111 are formed, shifts in arrangement positions, opening diameter error, etc. of the openings of the mask provided on the buffer layer 123 are assumed to occur. As a result, a part (sidewall) of the electrodes 111 may be positioned in a part of the recesses 123a of the buffer layer 123. FIGS. 5A, 5B, and 5C depict configuration examples of instances in which a part (sidewall closest to the optical waveguide 122a) of the electrodes 111 is formed in a shape so as to ride on the recesses 123a of the buffer layer 123.

In the configuration example depicted in FIG. 5A, the buffer layer 123 having a predetermined thickness is stacked on the thin-film LN layer 122. Here, at the surface the buffer layer 123, the recesses 123a are formed corresponding to the convex ridge portion of the optical waveguide 122a. Thereafter, the portions of the buffer layer 123 where the electrodes 111 are to be formed (the recesses 123a) are etched. During this etching, with the optical waveguide 122a as a center, a portion (width w2) of the buffer layer 123 spanning formation regions of the steps 123b is masked and openings corresponding to the steps 123b are provided in the mask. Further, portions of the buffer layer 123 are etched from the openings of the mask. By this etching, the steps 123b are formed in portions of the buffer layer 123 where the electrodes 111 are to be formed.

Subsequently, the electrodes 111 are formed on the steps 123b of the buffer layer 123. During formation of the electrodes 111, with the optical waveguide 122a as a center, a portion of the buffer layer 123 (the width w2) spanning formation regions of the steps 123b is masked and openings corresponding to the steps 123b are provided in the mask. Subsequently, the electrodes 111 are formed by vapor deposition from the openings of the mask.

Here, during etching when openings of the mask formed on the buffer layer 123 are formed or when the electrodes 111 are formed, due to shifts in arrangement positions, opening diameter error, etc. of the openings of the mask provided on the buffer layer 123, a part of the sidewalls of the electrodes 111 is positioned in the recesses 123a of the buffer layer 123. The electrodes 111 are shaped and positioned so as to have a portion having a width w4 (corresponds to amount of overlap) riding on the recesses 123a. The width w4, for example, occurs in an instance in which an opening diameter of the mask during formation of the electrodes 111 is smaller than an opening diameter of the mask during etching of the buffer layer 123.

In this manner, even in an instance in which the sidewalls of the electrodes 111 are partially positioned in the recesses 123a of the buffer layer 123, the positions of the steps 123b in the height direction are positions lower by the height h1 than the positions of the recesses 123a of the buffer layer 123 before the etching thereof. Further, the electrodes 111 are provided on the steps 123b of the buffer layer 123, whereby the electrodes 111 have the distance (width) w1 from the optical waveguide 122a and may be as close as possible to the optical waveguide 122a. The width w1 corresponds to a predetermined thickness when the buffer layer 123 is stacked on the thin-film LN layer 122 and has an effect of confining light to the optical waveguide 122a.

In this manner, the steps 123b are formed in portions of the buffer layer 123 where the electrodes 111 are to be formed. As a result, even in an instance in which the sidewalls of the electrodes 111 are positioned having the width w4 on the recesses 123a of the buffer layer 123, the thickness of the buffer layer 123 itself centered around the optical waveguide 122a is ensured and the electrodes 111 may be disposed near the optical waveguide 122a.

As a result, the tradeoff related to the thickness of the buffer layer is eliminated and the thin-film LN optical modulator 100 having low scattering loss and high electric field efficiency may be realized.

In configuration examples depicted in FIGS. 5B and 5C, the amount of etching is greater than that in configuration example depicted in FIG. 5A. In the configuration example depicted in FIG. 5B, an entire area of the portions of the buffer layer 123 where the electrodes 111 are formed (the recesses 123a) is etched. In addition, portions of the thin-film LN layer 122 are also etched a predetermined amount, thereby forming the steps 122b in these portions of the thin-film LN layer 122. Further, the electrodes 111 are formed on the steps 122b of the thin-film LN layer 122 by vapor deposition, etc. Here, similarly to FIG. 5A, due to shifts in the position of the mask, opening diameter error, etc., the sidewalls of the electrodes 111 are shaped and positioned so as to have a portion having the width w4 riding on the recesses 123a of the buffer layer 123 on the thin-film LN layer 122.

In this manner, even in an instance in which the sidewalls of the electrodes 111 are positioned having a portion thereof of the width w4 on the recesses 123a of the buffer layer 123 on the thin-film LN layer 122, the positions of the steps 122b in the height direction are positions lower by the height h2 than the positions of the recesses 123a of the buffer layer 123 before the etching thereof. Further, the electrodes 111 are provided having the bottom surfaces 111b thereof partially positioned on the steps 122b of the thin-film LN layer 122, whereby the electrodes 111 have the distance (width) w1 from the optical waveguide 122a and may be as close as possible to the optical waveguide 122a.

In the configuration example depicted in FIG. 5C, an entire area of the portions of the buffer layer 123 where the electrodes 111 are to be provided (the recesses 123a) is etched. In addition, an entire area of the thin-film LN layer 122 and the intermediate layer 121 is also etched a predetermined about, thereby forming steps 121b in portions of the intermediate layer 121. Further, the electrodes 111 are formed on the steps 121b of the intermediate layer 121. Here, similarly to FIG. 5A, due to shifts in the position of the mask, opening diameter error, etc., the sidewalls of the electrodes 111 are shaped and positioned so as to have a portion having the width w4 riding on the recesses 123a of the buffer layer 123 on the thin-film LN layer 122.

In this manner, even in an instance in which the sidewalls of the electrodes 111 are positioned having a portion thereof of the width w4 on the recesses 123a of the buffer layer 123 on the thin-film LN layer 122, the positions of the steps 121b in the height direction are positions lower by the height h3 than the positions of the recesses 123a of the buffer layer 123 before the etching thereof. Further, the electrodes 111 are provided having the bottom surfaces 111b thereof partially positioned on the steps 121b of the intermediate layer 121, whereby the electrodes 111 have the distance (width) w1 from the optical waveguide 122a and may be as close as possible to the optical waveguide 122a.

The etching amount in the configuration example depicted in FIG. 5B is greater than that in the configuration example depicted in FIG. 5A while the etching amount in the configuration example depicted in FIG. 5C is greater than that in the configuration example depicted in FIG. 5B. While the electric field efficiency is enhanced the greater is the etching amount, process difficulty also increases and therefore, an optimal structure is selected with consideration of necessary characteristics such as electric field efficiency, ease of manufacture, etc.

Figure 6A:
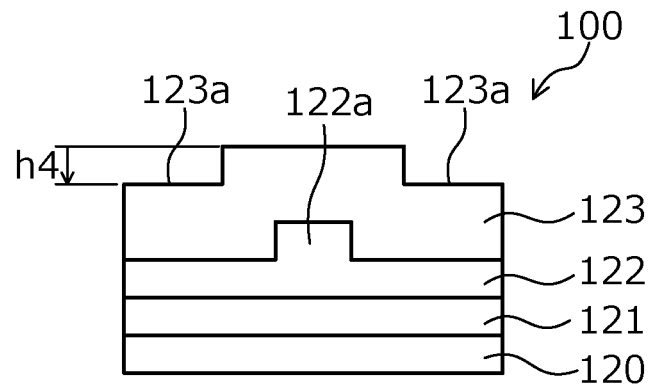
FIG. 6A is a manufacturing process diagram of a configuration example of the thin-film LN optical modulator according to the second embodiment.
Figure 6B:
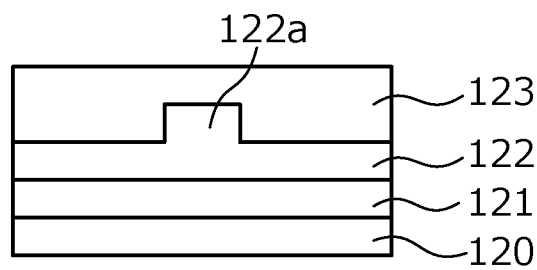
FIG. 6B is a manufacturing process diagram of the configuration example of the thin-film LN optical modulator according to the second embodiment.
Figure 6C:
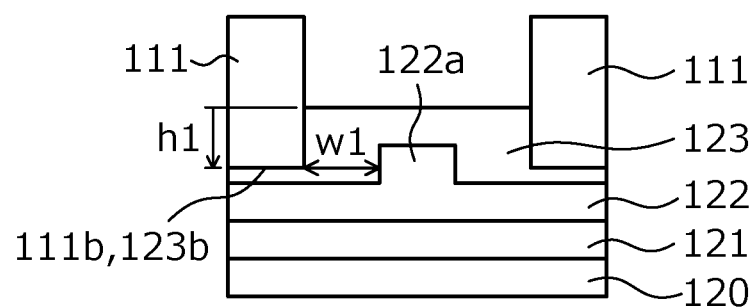
FIG. 6C is a manufacturing process diagram of the configuration example of the thin-film LN optical modulator according to the second embodiment.

FIGS. 6A, 6B, and 6C are manufacturing process diagrams of a configuration example of the thin-film LN optical modulator according to the second embodiment. In the configuration example depicted in FIGS. 6A, 6B, and 6C, the recesses 123a are not provided in the buffer layer 123 and the electrodes 111 are formed after the buffer layer 123 is planarized.

FIGS. 6A, 6B, and 6C each depict a manufacturing process. First, as depicted in FIG. 6A, the intermediate layer 121 and the thin-film LN layer 122 are stacked on the substrate 120. The thin-film LN layer 122 is etched, thereby forming the optical waveguide 122a (ridge portion) having a protruding shape. Thereafter, the buffer layer 123 is formed on an entire area of the surface of the thin-film LN layer 122 where the optical waveguide 122a having a protruding shape is formed. Here, at a surface of the buffer layer 123, the recesses 123a are formed corresponding to the convex ridge portion of the optical waveguide 122a.

Next, as depicted in FIG. 6B, a portion of the surface of the buffer layer 123 having a height h4 corresponding to the recesses 123a is removed, whereby the surface of the buffer layer 123 is planarized. This process of planarizing the buffer layer 123, for example, is performed in instances in which depending on the application state of electric field to the optical waveguide 122a, planarization provides more favorable application of the electric field.

Subsequently, as depicted in FIG. 6C, the portions of the buffer layer 123 where the electrodes 111 are to be provided are etched by the height h1. By this etching, the steps 123b are formed in the buffer layer 123 at the portions thereof where the electrodes 111 are to be provided. Subsequently, the electrodes 111 are formed on the steps 123b of the buffer layer 123.

As a result, the positions of the steps 123b in the height direction are positions lower by the height h1 than the position of the surface of the buffer layer 123. Subsequently, the electrodes 111 are provided on the steps 123b of the buffer layer 123, whereby the electrodes 111 have the distance (width) w1 from the optical waveguide 122a and may be as close as possible to the optical waveguide 122a. The width w1 corresponds to a predetermined thickness when the buffer layer 123 is stacked on the thin-film LN layer 122 and has an effect of confining light to the optical waveguide 122a.

In this manner, the steps 123b are formed in portions of the buffer layer 123 where the electrodes 111 are to be formed, whereby the thickness of the buffer layer 123 itself centered around the optical waveguide 122a is ensured and the electrodes 111 may be disposed near the optical waveguide 122a.

As a result, the tradeoff related to the thickness of the buffer layer is eliminated and the thin-film LN optical modulator 100 having low scattering loss and high electric field efficiency may be realized.

Further, even in an instance in which a planarization process is performed to the surface of the buffer layer 123, as described above, the amount of etching of the portions of the buffer layer 123 where the electrodes 111 are to be provided is not limited to that for the position of the height h1. For example, the etching amount may be for a deeper position, for example, increased to a position corresponding to the height h2 or the height h3 (refer to FIGS. 3B, 3C, etc.).

Figure 7A:
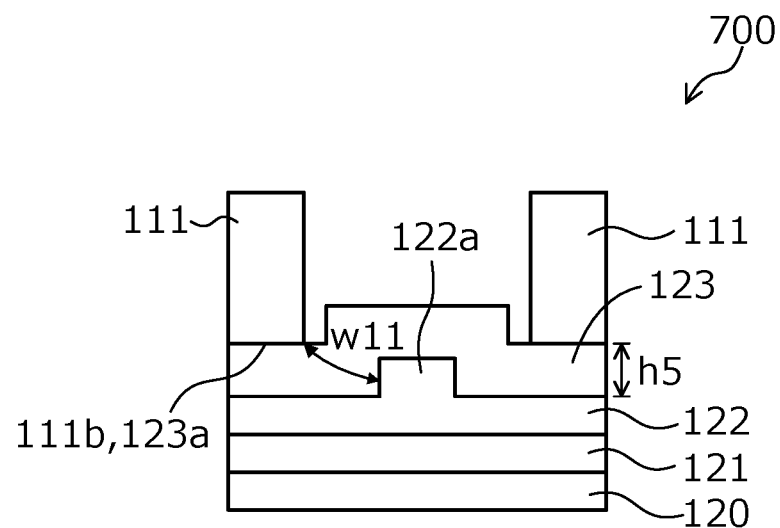
FIG. 7A is a cross-sectional view of a configuration example of a comparison thin-film LN optical modulator used for comparison with the second embodiment.
Figure 7B:
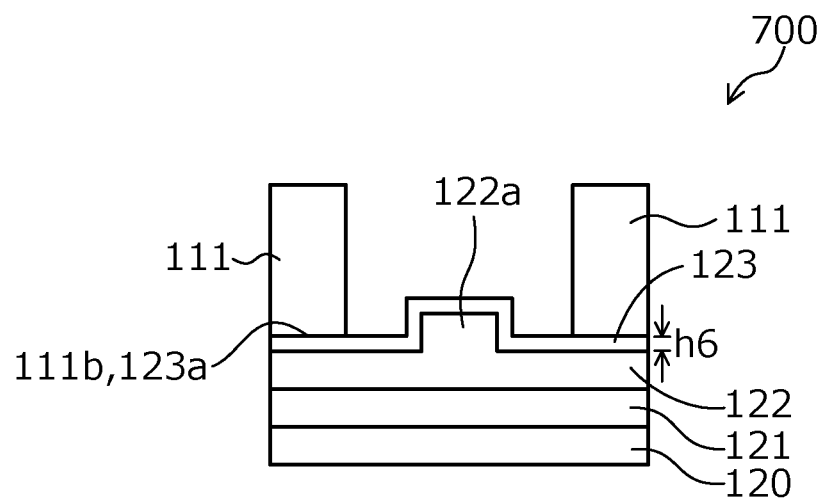
FIG. 7B is a cross-sectional view of a configuration example of a comparison thin-film LN optical modulator used for comparison with the second embodiment.

FIGS. 7A and 7B are cross-sectional views of configuration examples of comparison thin-film LN optical modulators used for comparison with the second embodiment. In FIGS. 7A and 7B, parts similar to parts in the second embodiment are indicated by the same reference characters used in the second embodiment. In a comparison thin-film LN optical modulator 700, the electrodes 111 are disposed on the recesses 123a of the buffer layer 123.

FIG. 7A depicts an instance in which the thickness of the buffer layer 123 is assumed to be a relatively thick predetermined thickness h5 (corresponds to stacked configuration of the first embodiment depicted in FIG. 1B). In this instance, the buffer layer 123 is formed having the constant thickness h5 at the sides and the top of the optical waveguide 122a, in a shape that follows the convex shape of the ridge portion of the optical waveguide 122a. Here, the recesses 123a are formed in the buffer layer 123, at the surface of portions thereof separate from the optical waveguide 122a.

Therefore, a distance (width) w11 between the optical waveguide 122a and the electrodes 111 is a distance that is wider (longer) than w1 described in the second embodiment. As a result, in the comparison thin-film LN optical modulator 700 having the structure depicted in FIG. 7A, the electric field efficiency decreases and the size of the optical modulator increases as compared to the second embodiment.

On the other hand, as depicted in FIG. 7B, the thickness of the buffer layer 123 is assumed to be a relatively thin predetermined thickness h6. In this instance, the buffer layer 123 is formed having the constant thickness h6 at the sides and the top of the optical waveguide 122a, in a shape that follows the convex shape of the ridge portion of the optical waveguide 122a.

In this instance, corresponding to the roughness of the sidewalls occurring when the optical waveguide 122a is formed, similar sidewall roughness further occurs at the sidewalls of the buffer layer 123. Here, in an instance in which the buffer layer 123 is formed to be thinner, confinement of light to the optical waveguide 122a weakens and scattering loss occurs due to the roughness of the sidewalls of the buffer layer 123. As a result, in the thin-film LN optical modulator 700 having the structure depicted in FIG. 7B, scattering loss increases as compared to the second embodiment.

In contrast, in the second embodiment, a predetermined thickness is ensured as the thickness of a portion of the buffer layer 123 covering the optical waveguide 122a and the steps 123b are provided in the buffer layer 123 at portions thereof where the electrodes 111 are to be provided. As a result, the electrodes 111 may be close to the optical waveguide 122a. Further, scattering loss due to the buffer layer 123 having a predetermined thickness is reduced and the electrodes 111 are disposed close to the optical waveguide 122a, whereby the electric field efficiency may be enhanced.

In this manner, in the second embodiment, configuration is not a matter of simply increasing the thickness of the buffer layer to reduce scattering loss due to sidewall roughness or a matter of simply providing the electrodes close to the optical waveguide. By providing the buffer layer having a predetermined thickness at the sidewalls and the top of the optical waveguide like in the second embodiment, light may be confined to the optical waveguide and scattering loss may be reduced. In addition, the electrodes are provided having the bottom surfaces thereof at positions lower than the position of the surface of the buffer layer, whereby electrodes may be as close as possible to the optical waveguide and the electric field efficiency may be enhanced. In this manner, according to the second embodiment, in addition to suppressing DC drift due to use of the same material in the buffer layer and the intermediate layer described in the first embodiment, the tradeoff between reducing scattering loss and improving electric field efficiency is eliminated, whereby it becomes possible to reduce scattering loss and improve electric field efficiency. As a result, the size of the thin-film LN optical modulator may be further reduced, overall characteristics may be improved, and long-term reliability of the thin-film LN optical modulator may be ensured.

As described above, the thin-film LN optical modulator 100 has the intermediate layer, the thin-film LN layer of lithium niobate, and the buffer layer stacked on the substrate, the optical waveguide formed in the thin-film LN layer, and the electrodes disposed close to the optical waveguide. Further, the same material is used in the intermediate layer and in the buffer layer. For example, a metal element of any one of group 3 to group 18 of the periodic table of elements is used in the intermediate layer 121 and the buffer layer 123. Further, a mixture or a compound of silicon oxide and an oxide of at least one metal element of any one of group 3 to group 18 of the periodic table of elements may be used in the intermediate layer and the buffer layer. Further, a mixture or a compound of silicon oxide and an oxide of at least one semiconductor element excluding silicon may be used in the intermediate layer 121 and the buffer layer 123. Further, a mixture or a compound of silicon oxide and an oxide containing at least one semiconductor element excluding silicon and at least one metal element of any one of group 3 to group 18 of the periodic table of elements may be used in the intermediate layer 121 and the buffer layer 123. As a result, a negative drift state after voltage is applied to the electrodes may be prolonged, enabling DC drift characteristics to be significantly improved. As a result, long-term reliability of the thin-film LN optical modulator 100 may be ensured.

Further, in the thin-film LN optical modulator 100, a material containing an X-cut lithium niobate may be used in the thin-film LN layer. As a result, electric field does not have to be applied in a vertical direction of the optical waveguide, the electrodes are disposed on the sides of the optical waveguide, and light may be confined to a minute region (optical waveguide). Further, an interval between the optical waveguide and the electrodes is reduced, whereby an advantage of thin-film LN may be maximized, that is, the electric field efficiency may be improved.

Further, in the thin-film LN optical modulator 100, the bottom surfaces of the electrodes may be provided on the steps positioned at the predetermined depth h1 in the buffer layer. Further, the bottom surfaces of the electrodes may be provided on the steps positioned at the predetermined depth h2 from the surface of the buffer layer, in the thin-film LN layer. Further, the bottom surfaces of the electrodes may be provided on the steps positioned at the predetermined depth h3 from the surface of the buffer layer, in the intermediate layer. These depth positions may be easily obtained by changing the etching amount of the portions where the electrodes are to be provided. Thus, by the buffer layer having a predetermined thickness with respect to the top and the sidewalls of the optical waveguide, light may be confined to the optical waveguide, enabling scattering loss to be reduced and the electrodes may be as close as possible to the optical waveguide, enabling the electric field efficiency to be improved.

Further, in the thin-film LN optical modulator 100, the recesses that occur in the buffer layer stacked on the thin-film LN layer as a consequence of the ridge shape of the optical waveguide formed in the thin-film LN layer may be planarized. For example, the recesses may be removed by etching, whereby the surface of the buffer layer may be planarized. This planarization, for example, may be performed in instances in which depending on the application state of electric field to the optical waveguide, planarization provides more favorable application of the electric field.

According to one aspect of the embodiments, an optical waveguide device that suppresses DC drift and achieves long-term reliability may be provided.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical waveguide device, comprising:
a substrate on which an intermediate layer, a thin-film LN layer of lithium niobate, and a buffer layer are stacked;
an optical waveguide formed in the thin-film LN layer; and
a plurality of electrodes near the optical waveguide, wherein,
the intermediate layer and the buffer layer contain a same material of a metal element of any one of group 3 to group 18 of a periodic table of elements,
the electrodes are disposed so that respective bottom surfaces thereof are at positions lower than a position of a surface of the buffer layer;
the thin-film LN layer has a plurality of steps provided therein at a predetermined depth from the surface of the buffer layer, and
the electrodes are disposed so that the bottom surfaces thereof are on the steps, respectively.

2. An optical waveguide device, comprising:
a substrate on which an intermediate layer, a thin-film LN layer of lithium niobate, and a buffer layer are stacked;
an optical waveguide formed in the thin-film LN layer; and
a plurality of electrodes near the optical waveguide, wherein
the intermediate layer and the buffer layer contain a same material of a metal element of any one of group 3 to group 18 of a periodic table of elements,
the electrodes are disposed so that respective bottom surfaces thereof are at positions lower than a position of a surface of the buffer layer;
the intermediate layer has a plurality of steps provided therein at a predetermined depth from the surface of the buffer layer, and
the electrodes are disposed so that the bottom surfaces thereof are on the steps, respectively.

3. The optical waveguide device according to claim 2, wherein
the intermediate layer and the buffer layer contain silicon oxide and an oxide of indium.

4. The optical waveguide device according to claim 2, wherein
the intermediate layer and the buffer layer contain silicon oxide and an oxide of titanium.

5. The optical waveguide device according to claim 2, wherein
the intermediate layer and the buffer layer contain silicon oxide and an oxide of tin.

6. The optical waveguide device according to claim 2, wherein
the intermediate layer and the buffer layer contain silicon oxide and an oxide of germanium.

7. The optical waveguide device according to claim 2, wherein
the intermediate layer and the buffer layer contain silicon oxide and an oxide of zinc.

8. The optical waveguide device according to claim 3, wherein
the intermediate layer and the buffer layer further contain an oxide of a second metal or a second semiconductor element.

9. The optical waveguide device according to claim 2, wherein
the intermediate layer and the buffer layer contain a mixture or a compound of silicon oxide and an oxide of at least one metal element of group 3 to group 18 of the periodic table of elements.

10. The optical waveguide device according to claim 2, wherein
the intermediate layer and the buffer layer contain a mixture or a compound of silicon oxide and an oxide of at least one semiconductor element excluding silicon.

11. The optical waveguide device according to claim 2, wherein the intermediate layer and the buffer layer contain a mixture or a compound of silicon oxide and an oxide containing at least one metal element of any one of group 3 to group 18 of the periodic table of elements and at least one semiconductor element excluding silicon.

12. The optical waveguide device according to claim 2, wherein the thin-film LN layer contains an X-cut lithium niobate.

13. The optical waveguide device according to claim 2, wherein the buffer layer is stacked on the thin-film LN layer and recesses that occur in the buffer layer corresponding to a shape of the optical waveguide formed in the thin-film LN layer are planarized.

* * * * *